UNITED STATES PATENT OFFICE.

FRANCIS H. HATCH, OF NEW ORLEANS, LOUISIANA, AND BENJAMIN R. HAWLEY, OF NORMAL, ILLINOIS.

IMPROVEMENT IN PRESERVING MEAT.

Specification forming part of Letters Patent No. 107,367, dated September 13, 1870.

*To all whom it may concern:*

Be it known that we, FRANCIS H. HATCH, of New Orleans, parish of Orleans, State of Louisiana, and BENJAMIN R. HAWLEY, of Normal, in the county of McLean, and in the State of Illinois, have invented certain new and useful Improvements in Process for Preserving Meat; and do hereby declare that the following is a full, clear, and exact description thereof.

By continued experiments we have found that the most perfect plan for desiccating and preserving animal flesh for human food is by the use of simply pure air, made to flow in such rapidity as may be desired, and at any temperature, so as most nearly to resemble the drying process seen in nature in a hot and windy day.

Up to this time all efforts to accomplish this object, or to carry on any extended or continued operations in tropical latitudes, have proved valueless or impracticable on account of constant changes in the weather, of temperature, and conditions of the atmosphhere.

By our plan we secure all the benefits of a hot, dry wind in the open air, and are enabled to carry on the drying uninterruptedly to any extent, without regard to the conditions of the external air, whether hot or cold, wet or dry, and in any climate. To accomplish this desirable result we pass a rapid current of air through a tight room, where the meat is to be hung or placed on shelves, admitting the air to the top of the room and passing it downward through the drying substances, and exhausting or taking the air out at the bottom. By this means we are enabled to produce an equal temperature at the same height or level in any part of the room, and thus to dry evenly, and more or less rapidly, according to the temperature and velocity of the air.

It will be observed that by this constant change of air from top to bottom we are always carrying off the damp air and all noxious gases that may be liberated from the meat, and the room is always kept pure and sweet without the use of any chemicals or absorbents, as is necessary in all large rooms used for preserving meat on any other plan now in use.

With this change of air, at a high temperature, we have discovered that the flesh of animals desiccated, or the moisture absorbed to a certain extent, (say from fifty to sixty per cent. of the original weight when killed,) becomes perfectly cured, with or without the use of salt or other antiseptics, and by our plan of compressing and canning, hereinafter explained, may be preserved in a perfectly pure and natural condition for an indefinite period.

To understand our plan fully, it will be proper to state that in all countries where animals are slaughtered and their meat packed in salt, or otherwise, for long preservation, that it can be done only at such a season of the year, and at such a low temperature, that the meat is readily cooled, so as to expel the animal heat before salting or packing, or it will not keep. Consequently it is a well-known fact that in all tropical countries where the bovine animal is most plentiful and in the greatest perfection but little or nothing is done in meat-packing, and these animals, on which so large a portion of mankind depend for animal food, are only made available by expensive and damaging transportation, or by driving immense distances, when the animal is delivered in an unhealthy and impoverished state, or rehabilitated in a flesh greatly inferior to its normal condition.

We now introduce a new principle, intended to utilize meat-providing animals, mainly the beef-animal, where found in the greatest numbers and perfection, that will enable any one to slaughter, cure, and pack meat for long preservation in all climates and at all seasons of the year. We designate this plan as "the system of curing meat by expelling the animal heat, so called, by artificial heat," and the article produced from beef as "bovine."

Our plan is as follows: We place our meat, when slaughtered and cut in thin steaks or strips, in a room, as before described, at a temperature varying from 130° Fahrenheit upward, according to the desired rapidity of drying, and keep it thus for hours or days, as occasion requires. When the meat is sufficiently dried we place it in molds of various sizes, and subject it to heavy pressure, to expel the air and bring it to a density greater than water; then pack in tin or wooden cans, leaving a small space to surround the meat with molten suet or marrow of the bones, and hermetically sealed.

This article of food, the purest that can be produced, may be cured with or without salt, thereby avoiding the deleterious effects of salt meats on long voyages.

By this method the weight of nutrition, but of much better quality, contained in a barrel of mess-beef, weighing in gross three hundred and forty or three hundred and fifty pounds, is put in a convenient package in one-sixth of the weight and bulk.

This article is a rich and palatable food, with or without cooking, and, in view of its healthfulness, density, and convenience for transportation, its great advantage over all other provision for supplying armies and navies is apparent.

Fish or other animal substances may be preserved in the same manner.

Hides may be dried and prepared ready for market by the same curing process in a few hours.

Having thus fully described our invention, what we claim as new, and desire to secure by Letters Patent, is—

1. The method herein described of curing meat by the expulsion of the animal heat by means of artificial heat, substantially as set forth.

2. The method herein described of expelling the animal heat from meat or other animal substances by means of a continuous current of heated air made to pass through the room in which the meat is placed, for the purposes set forth.

3. The method herein described of reducing the bulk and expelling the air from the meat thus cured by means of compression, substantially as and for the purposes set forth.

4. The method herein described of packing meat thus cured and compressed by surrounding the meat inside the package with the melted fat or marrow of the animal and hermetically sealing the package, substantially as set forth.

5. The method herein described of curing and preserving meat without cooking by expelling the animal heat by means of artificial heat, compressing it, and then surrounding it inside of a hermetically-sealed package with the melted fat or marrow of the animal, substantially as set forth.

6. As a new article, raw meat put up in hermetically-sealed packages, for the purposes herein set forth, and designated as "bovine."

In testimony that we claim the foregoing we have hereunto set our hands this 12th day of August, 1870.

FRANCIS H. HATCH.
    B. R. HAWLEY.

Witnesses:
 C. O. ALEXANDER,
 C. L. EVERT.